(12) United States Patent  
Cosmann (10) Patent No.: US 8,966,819 B1  
(45) Date of Patent: Mar. 3, 2015

(54) SUSPENDABLE AND STACKABLE VERTICAL PLANTER

(71) Applicant: Neila Cosmann, Albrightsville, PA (US)

(72) Inventor: Neila Cosmann, Albrightsville, PA (US)

( * ) Notice: Subject to any disclaimer, the term of this patent is extended or adjusted under 35 U.S.C. 154(b) by 124 days.

(21) Appl. No.: 13/863,844

(22) Filed: Apr. 16, 2013

(51) Int. Cl.  
*A01G 9/02* (2006.01)

(52) U.S. Cl.  
CPC ...................... *A01G 9/023* (2013.01)  
USPC ............................................... 47/83

(58) Field of Classification Search  
CPC ............................... A01G 9/022; A01G 9/023  
USPC ................... 47/65.9, 67, 82, 83, 65.5  
See application file for complete search history.

(56) References Cited

U.S. PATENT DOCUMENTS

| | | | |
|---|---|---|---|
| 4,593,490 A * | 6/1986 | Bodine | 47/79 |
| 7,080,482 B1 * | 7/2006 | Bradley | 47/60 |
| 7,788,848 B1 * | 9/2010 | Koumoudis | 47/65.9 |
| 7,926,224 B1 * | 4/2011 | Koumoudis | 47/65.9 |
| 8,250,804 B2 * | 8/2012 | Chang | 47/39 |
| 2010/0037517 A1 * | 2/2010 | Copping et al. | 47/79 |
| 2011/0258925 A1 * | 10/2011 | Baker | 47/65.8 |
| 2013/0180172 A1 * | 7/2013 | Silverberg | 47/65 |

FOREIGN PATENT DOCUMENTS

| | | | | |
|---|---|---|---|---|
| WO | WO 8803360 A1 * | 5/1988 | | A01G 9/02 |
| WO | WO 2010009505 A1 * | 1/2010 | | A01G 9/02 |

* cited by examiner

*Primary Examiner* — David Parsley  
*Assistant Examiner* — Danielle Clerkley  
(74) *Attorney, Agent, or Firm* — Michael I. Kroll (57) ABSTRACT

A vertical planter having an exterior fastener allowing the planter to be hung on a wall. The planter may be free standing or may be stacked one atop another. The planter comprises front and back mateable portions, base receptacle and top plate. The front portion has a plurality of tangently projecting plant receptacles and a pair of spaced apart sides terminating in a rail-like edge. The back portion extends into a pair of sides terminating in channels for seating respective front portion side edges. The base receptacle forms a seat for the front and back portions. The base receptacle back wall is folded forming a catch that matingly engages a back portion transverse crossbar. The top plate has a plurality of apertures, enabling water to pass into the vertical planter cavity with the plate positioned on a ledge of the front and back portions forming a support when stacking planters.

5 Claims, 10 Drawing Sheets

SUSPENDABLE AND STACKABLE VERTICAL PLANTER

BACKGROUND OF THE INVENTION

1. Field of the Invention

The present invention relates generally to planters and, more specifically, to a vertical planter having an exterior fastener allowing the planter to be hung from a structure, such as a stanchion or wall and further provides the planter with a base receptacle so that the planter may be free standing or may be stacked one atop another.

The vertical planter comprises a front and back mateable portions, base receptacle and top plate. The front portion is substantially planar having a plurality of tangently projecting plant receptacle projecting outwardly from said front portion with the front portion angularly extending into a pair of spaced apart sides terminating in a rail-like edge. The back portion is also substantially planar, angularly extending into a pair of spaced apart sides terminating in a channel for seating a respective front rail edge therein. The back portion also provides a transverse cross bar. The base receptacle forms seat for the front and back portions and provides an aperture that can serve as a water return or planter drain. The base receptacle has a front wall extending into side walls terminating in a back wall that is then folded in forming a hook-like lip that matingly engages the back portion transverse cross bar.

The top plate is substantially planar having a plurality of linearly aligned apertures enabling water to pass into the vertical planter cavity with the plate positioned on the ledge of the front and back portions forming support when stacking one vertical planter atop another.

2. Description of the Prior Art

There are other devices that are designed as planters. While these planters may be suitable for the purposes for which they where designed, they would not be as suitable for the purposes of the present invention as heretofore described.

It is thus desirable to provide a vertical planter having mateable front and back portions with one providing a channel that receives the rail-like edge of the other portion with both seated within a base receptacle that has a side extending hook-like to matingly engage the transverse cross bar.

It is further desirable to provide a vertical planter having an interior ledge supporting a top plate that can be used as seat to support another planter when stacked.

SUMMARY OF THE PRESENT INVENTION

A primary object of the present invention is to provide a vertical planter having a plurality of plant receptacles incorporating exterior fastener whereby the planter can be hung from a structure, such as a wall, and/or free standing.

Another object of the present invention is to provide a vertical planter comprising a front portion, back portion, base receptacle and top plate.

Yet another object of the present invention is to provide a vertical planter wherein said front portion is substantially planar having a plurality of tube-like tangently extending plant receptacles.

Still yet another object of the present invention is to provide a vertical planter wherein said front portion extends into a pair of angularly extending side portions that terminate in a rail-like edge.

An additional object of the present invention is to provide a vertical planter wherein said front portion wall diverges outwardly before projecting upwardly thereby forming an interior ledge for supporting the top plate.

A further object of the present invention is to provide a vertical planter wherein said back portion is substantially planar extending into a pair of angularly extending side portions that terminate in a channel for receiving a respective front portion rail-like edge therein.

A yet further object of the present invention is to provide a vertical planter wherein said back portion wall diverges outwardly before projecting upwardly thereby forming an interior ledge for supporting the top plate thereon.

A still yet further object of the present invention is to provide a back portion having a transverse cross bar spaced away from the back portion bottom edge.

Another object of the present invention is to provide a vertical planter further providing an upper exterior transverse support member whereby the vertical planter can be hung from a structure, such as a wall, and further provides a lower end transverse spacer so that when hung the spacer will keep the planter oriented vertically.

Yet another object of the present invention is to provide a vertical planter wherein said base receptacle has a bottom wall with upwardly depending wall segments with the back wall extending above the wall segments then curvilinearly extends into a channel-like lip that latches onto the back portion transverse cross bar.

Still yet another object of the present invention is to provide a vertical planter having a top plate with a plurality of linearly aligned apertures whereby water can be introduced into the planter cavity or when stacked water will flow into the bottom vertical planter.

A further object of the present invention is to provide a vertical planter having a top plate with a plurality of linearly aligned apertures whereby water can be introduced into the planter cavity or when stacked water will flow into the bottom vertical planter.

Additional objects of the present invention will appear as the description proceeds.

The present invention overcomes the shortcomings of the prior art by providing a vertical planter having an exterior fastener allowing the planter to be hung and further provides the planter with a base receptacle so that the planter may be free standing or may be stacked one atop another. The planter comprises front and back mateable portions, base receptacle and top plate. The front portion has a plurality of tangently projecting plant receptacles and a pair of spaced apart sides terminating in a rail-like edge with the back extending into a pair of sides terminating in a channel for seating a respective front rail-like edge therein. The base receptacle having periphery walls forms seat for the front and back portions with the base receptacle back wall folded in forming a hook-like lip that matingly engages the back portion transverse cross bar. The top plate is substantially planar having a plurality of linearly aligned apertures enabling water to pass into the vertical planter cavity with the plate positioned on the ledge of the front and back portions forming support when stacking planters.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar reference characters denote similar elements throughout the several views, the Figures illustrate the suspendable and stackable vertical planter of the present invention. With regard to the reference numerals used, the following numbering is used throughout the various drawing figures.

20 vertical planter
22 room
24 wall
26 front portion of planter 20
28 back portion of planter 20
30 base receptacle of planter 20
32 top plate of planter 20
34 left side of front portion 26
36 right side of front portion 26
38 plant receptacle in front portion 26
40 left side of back portion 28
42 right side of back portion 28
44 channel on edge of left and right sides 40, 42
45 edge of left and right sides 34, 36
46 transverse rail on back portion 28
48 longitudinal catch on base receptacle 30
50 ledge in front and back portions 26, 28
52 transverse hook on back portion 28
53 spacer bar on back portion 28
54 bottom wall of base receptacle 30
56 vertical front wall of base receptacle 30
58 vertical back wall of base receptacle 30
60 vertical side wall of base receptacle 30
62 drain aperture of base receptacle 30
64 nipple on drain aperture 62
68 plant for plant receptacle 38
70 spacer for front and back portions 26, 28
72 aperture in top plate 30
74 soil

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Figure 1:
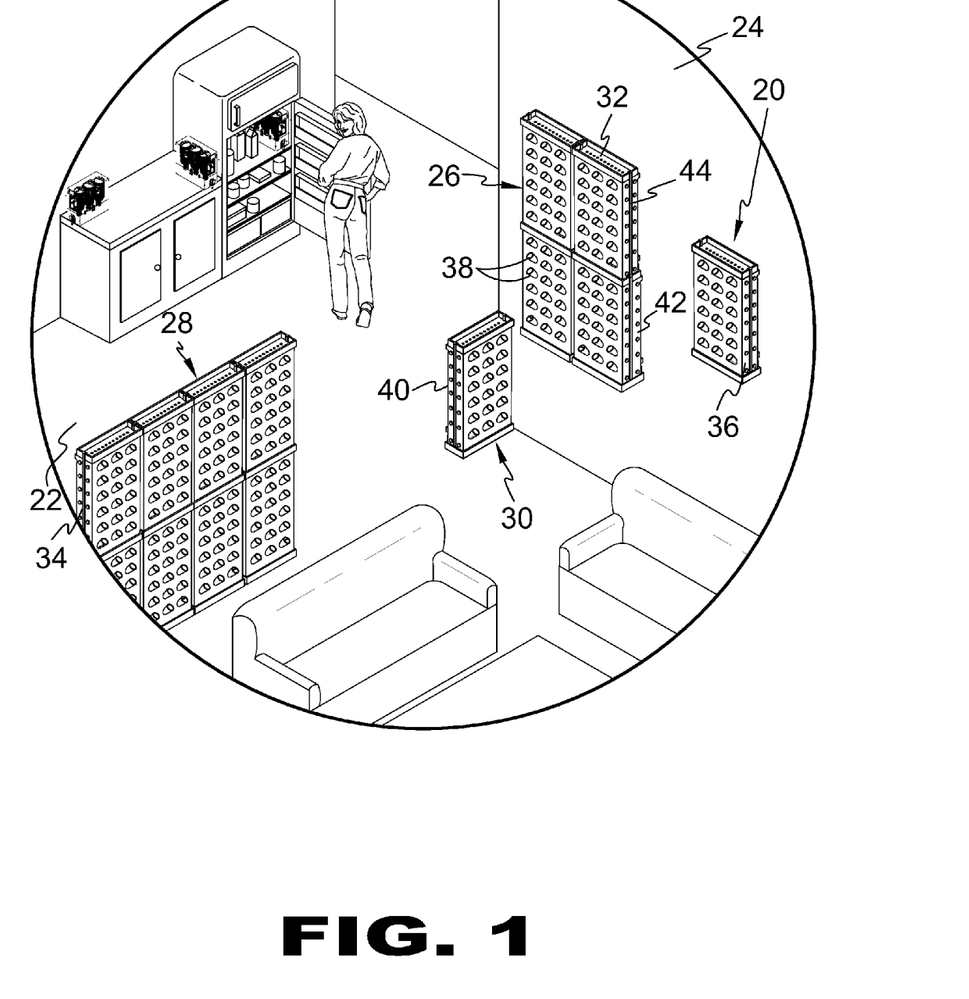
FIG. 1 is an illustrative view of the planter of the present invention in use.

Referring to FIG. 1, shown is an illustrative view of the planter of the present invention in use. The present invention is a stand alone or stackable rectangularly shaped vertical planter 20 being a housing unit that can serve as a room 22 or wall 24 divider, or mounted to a structure, such as a wall 24. The vertical planter 20 comprises a front portion 26, back portion 28, base receptacle 30 and top plate 32. The front portion 26 is mainly planar with substantially right-angled left and right sides 34,36 with a plurality of plant receptacles 38 extending tangentially from the front portion 26. The back portion 28 is substantially planar also having right-angled left and right sides 40,42, each having a terminal edge forming a channel 44 receiving a respective front portion 26 left and right side edge 45 therein. The base receptacle 30 forms a stand for the assembled front and back portions 26,28 to be placed therein with the back portion 28 having a transverse rail 46 and the base receptacle 30 having a longitudinal catch 48 mateable onto the rail 46, thereby fastening the planter's base receptacle 30 to the bottom of the mated front and back portions 26,28. Both of the front and back portions 26,28 top ends have interiorly extending ledges 50 forming a seat for the planter's top plate 32.

Figure 2:
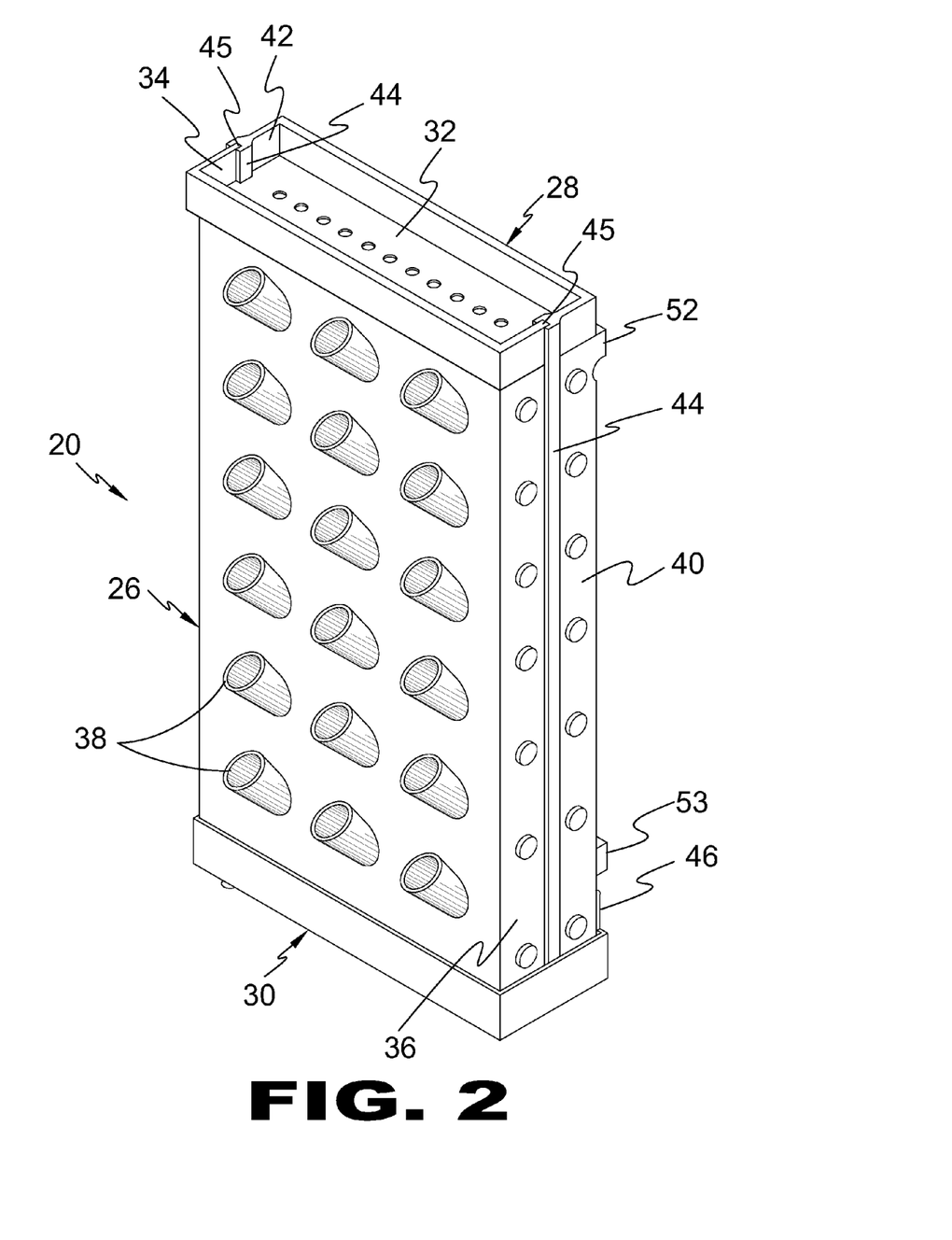
FIG. 2 is a perspective view of the vertical planter of the present invention.

Referring to FIG. 2, shown is a perspective view of the vertical planter of the present invention. The planter 20 comprises a front portion 26 having left and right sides 34,36 each terminating in a rail edge 45, back portion 28 having left and right sides 40,42 terminating in channels 44 that receive a respective free edge 45 therein, a base receptacle 30 and a top plate 32 supported on ledges 50 formed within the front and back portions 26,28, so that a vertical planter 20 can be stacked upon another, thereby forming a room divider. The vertical planter 20 also provides for a transverse hook 52 positioned approximately across the top of the back portion 28, so that the vertical planter 20 can be hung from a wall 24. Further provided is a spacer bar 53 positioned approximately across the bottom of the back portion 28, so that the planter 20 will hang vertically when hung upon the wall 24.

Figure 3:
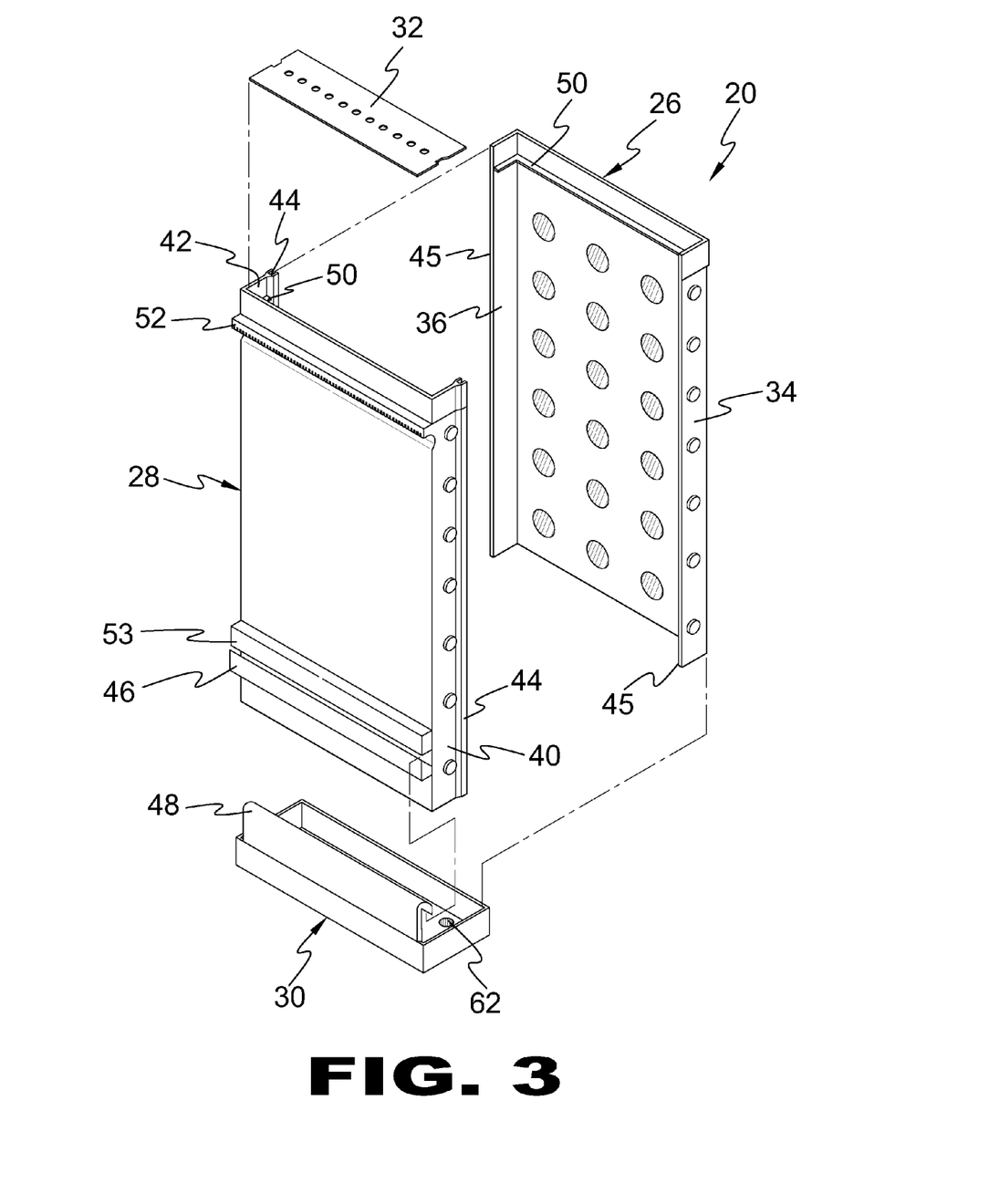
FIG. 3 is an exploded view of the vertical planter of the present invention.

Referring to FIG. 3, shown is an exploded view of the vertical planter of the present invention. The present invention provides a vertical planter 20 comprising mateable front and back portions 26,28, a base receptacle 30 receiving the mated front and back portions 26,28 and a top plate 32 that is positioned on ledges 50 extending across the front and back portions 26,28. The planter 20 is designed to be free standing or mounted onto a structure, such as a wall 24.

Figure 4:
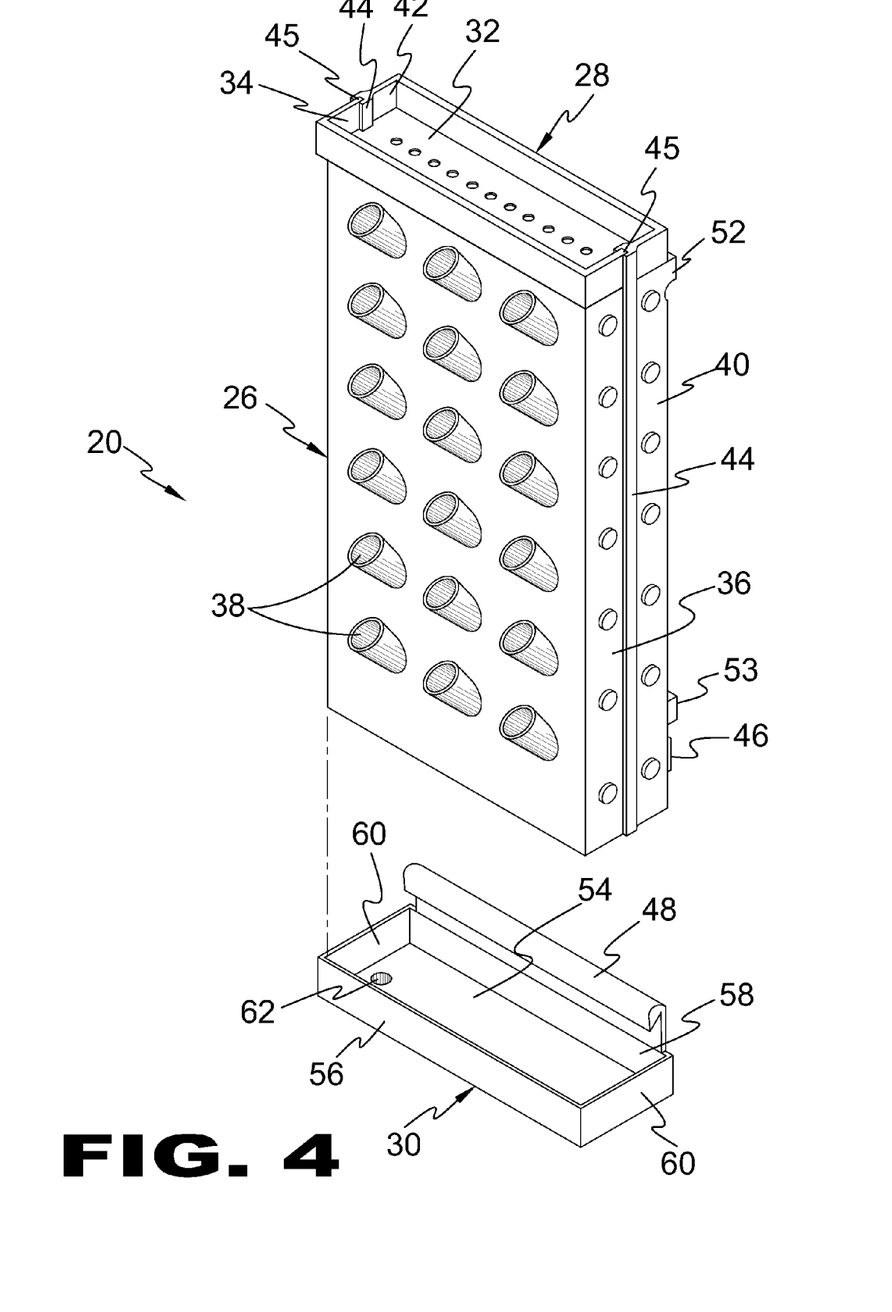
FIG. 4 is an illustrative view of the base receptacle removed from the vertical housing.

Referring to FIG. 4, shown is an illustrative view of the base receptacle removed from the vertical housing. The vertical planter base receptacle 30 has a bottom wall 54 with vertically front, back and side walls 56,58,60. The back wall 56 vertically rises above the other walls then curvilinearly extending forming a catch 48 that latches onto a back portion transverse rail 46 locking the assembly together. The base receptacle 30 also provides a drain aperture 62 that may also provide a nipple 64 around the aperture 62 for a drain hose to be fastened thereto.

Figure 5:
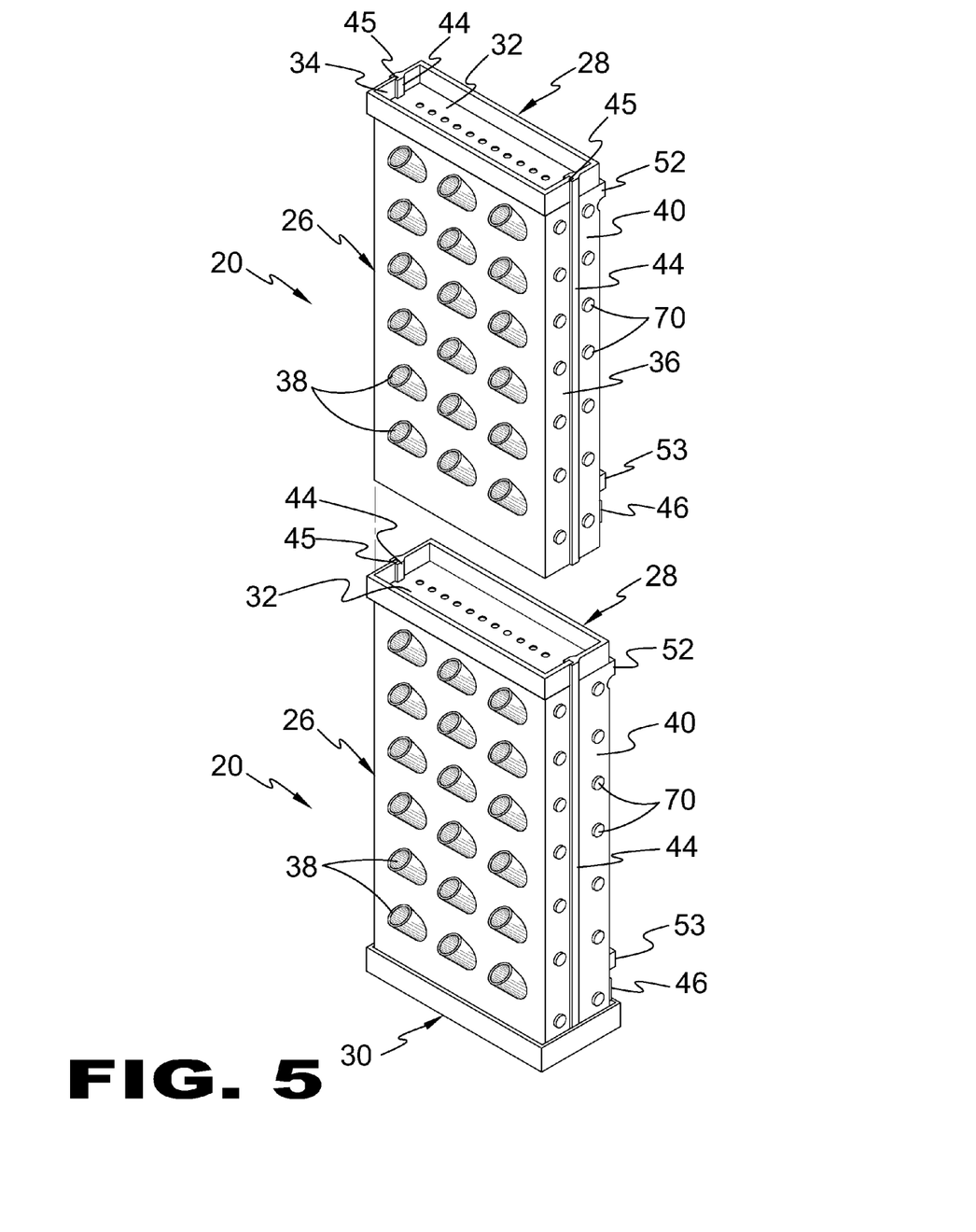
FIG. 5 is an exploded view of the stackable vertical planter of the present invention.

Referring to FIG. 5, shown is an exploded view of the stackable vertical planter of the present invention. Illustrated is a pair of vertical planters 20 of the present invention that can be stacked one upon another forming a wall divider or room separator. It should also be noted that while illustrated with the plant receptacles 38 aligned on one portion, they can also be stacked with plants 68 on opposing portions or positioned back to back thereby having plants 68 on both portions. Further illustrated are the sides of the front and back portions 26,28 having spacers 70 extending the length thereof, so that when the planters 20 are placed side by side they engage each other compensating for the thickness of the base receptacles 30.

Figure 6:
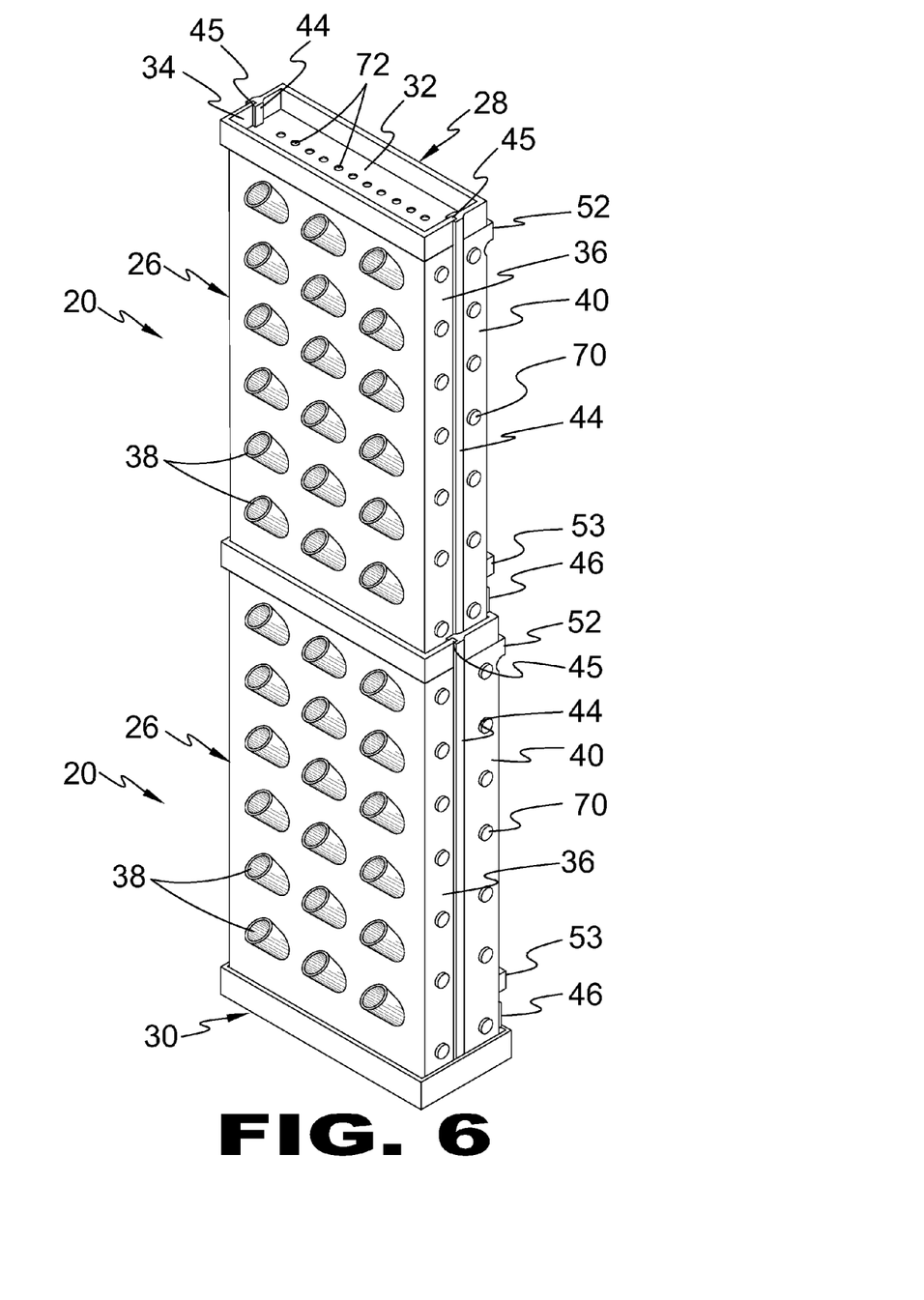
FIG. 6 is a perspective view of a pair of stacked vertical planters.

Referring to FIG. 6, shown is a perspective view of a pair of stacked vertical planters. Depicted is one vertical planter 20 stacked within another. An assembled vertical planter 20 has a top plate 32 that sits on recessed ledges 50 extending across the front and back planter portions 26,28 forming support for another planter front portion 26, back portion 28 and top plate 32, to be assembled and inserted into the lower vertical planter 20 top end recess. As illustrated, the top plate 32 has a plurality of apertures 72 for fluid flow, so that when the top planter 20 is watered, the water can pass between the top and bottom vertical planters 20.

Figure 7:
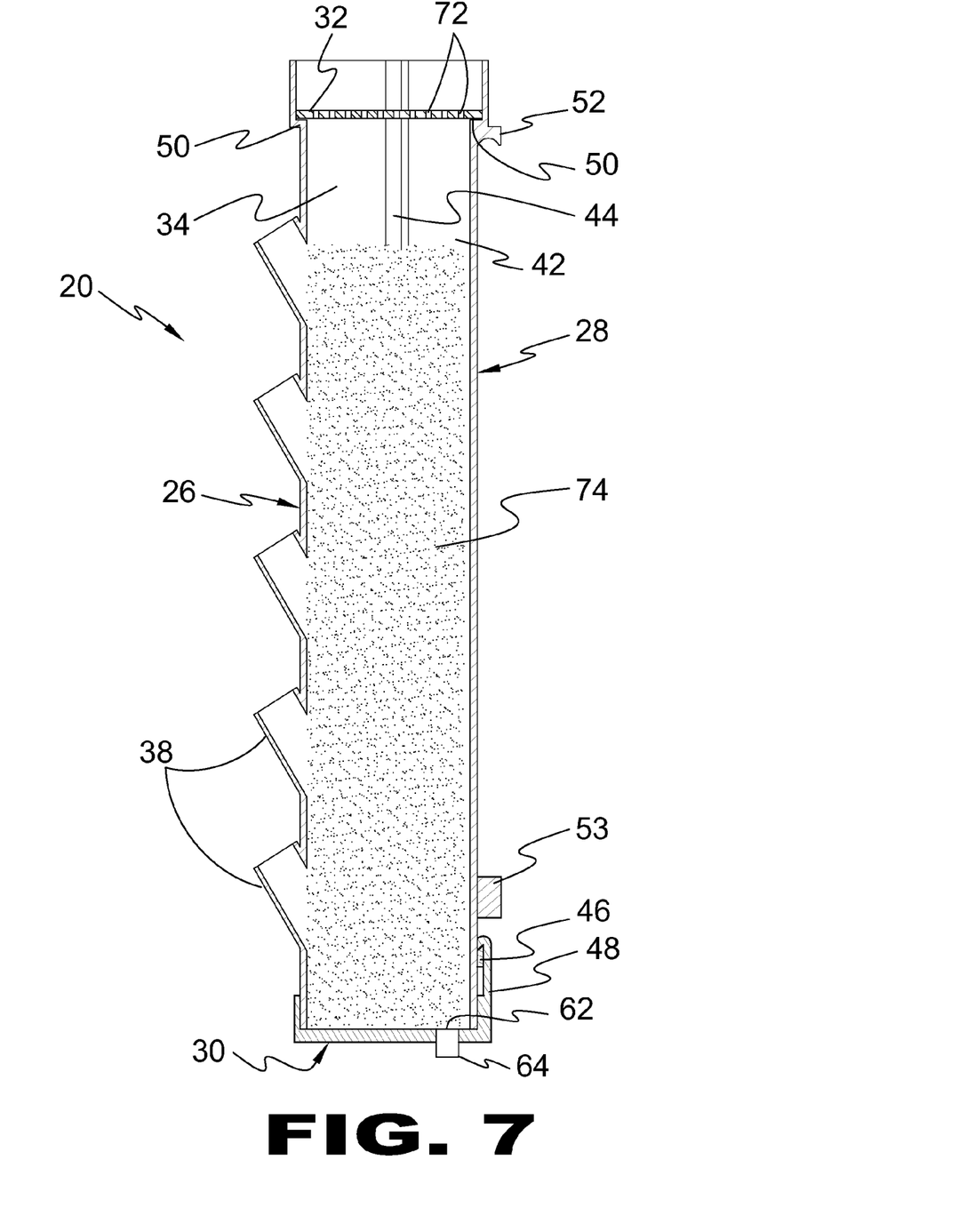
FIG. 7 is a sectional view of the vertical planter of the present invention.

Referring to FIG. 7, shown is a sectional view of the vertical planter of the present invention. Shown is a sectional view of the vertical planter 20 having front and back portions 26,28 having sides that mate edges 45 to channels 44. The planter 20 is positioned within a base receptacle 30 that latches onto the back portion 28 holding the front and back portions 26,28 together within the base receptacle 30, which also provides a drain aperture 62. The rectangular shaped planter 20 of the present invention has a plurality of plant receptacles 38 with extruded hollow apertures with plants 68 occupying the apertures of the plant receptacle 38. The drain aperture 62 is for the drainage of water. The planter 20 may be filled with soil 74 or a water drip process for plant nutrition.

Figure 8:
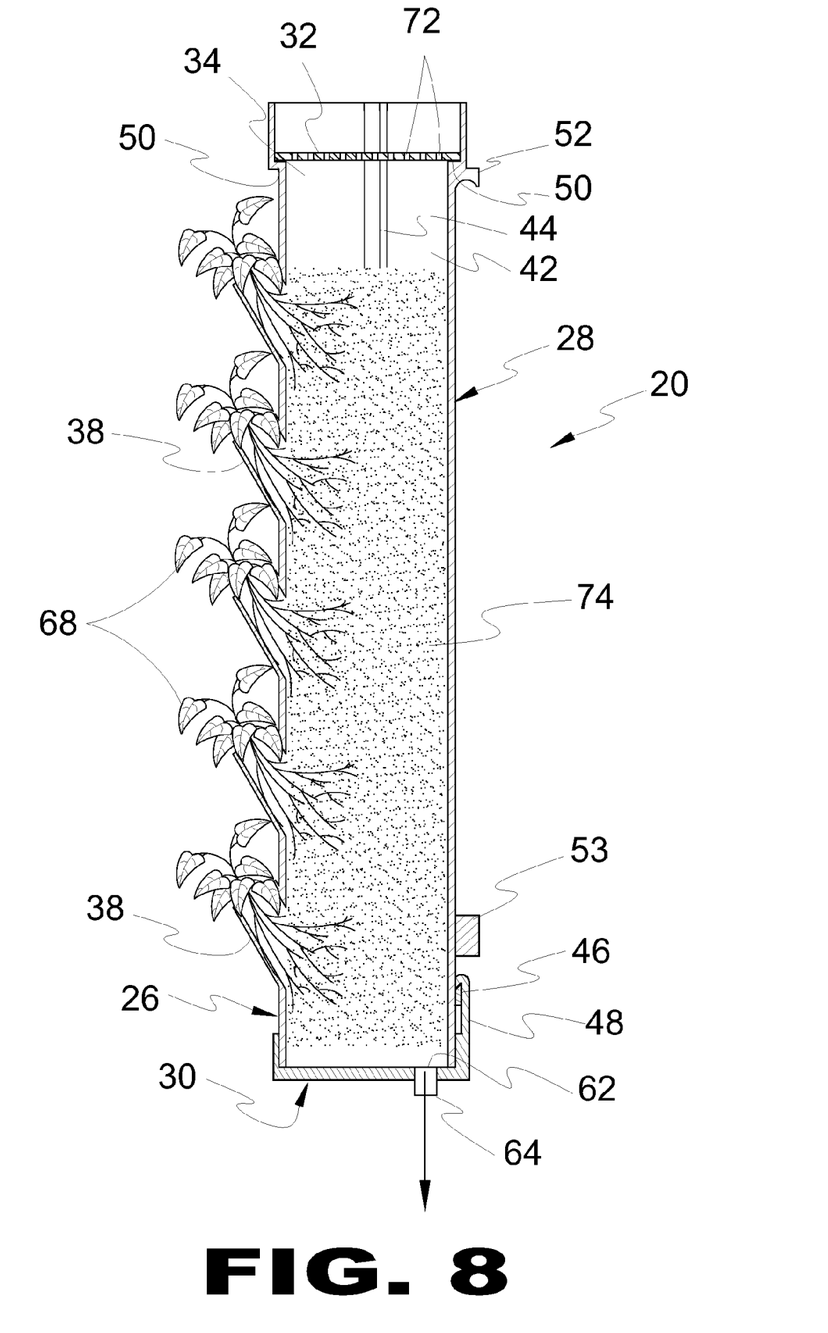
FIG. 8 is a sectional view of the vertical planter of the present invention.

Referring to FIG. 8, shown is a sectional view of the vertical planter of the present invention. Shown is a sectional view of the rectangular shaped planter 20 of the present invention having a plurality of plant receptacle 38 having extruded hollow apertures with plants 68 therein. The base receptacle 30 contains a drain aperture 62 for the drainage of water. The planter 20 may be filled with soil 74 or a water drip process for plant nutrition.

Figure 9:
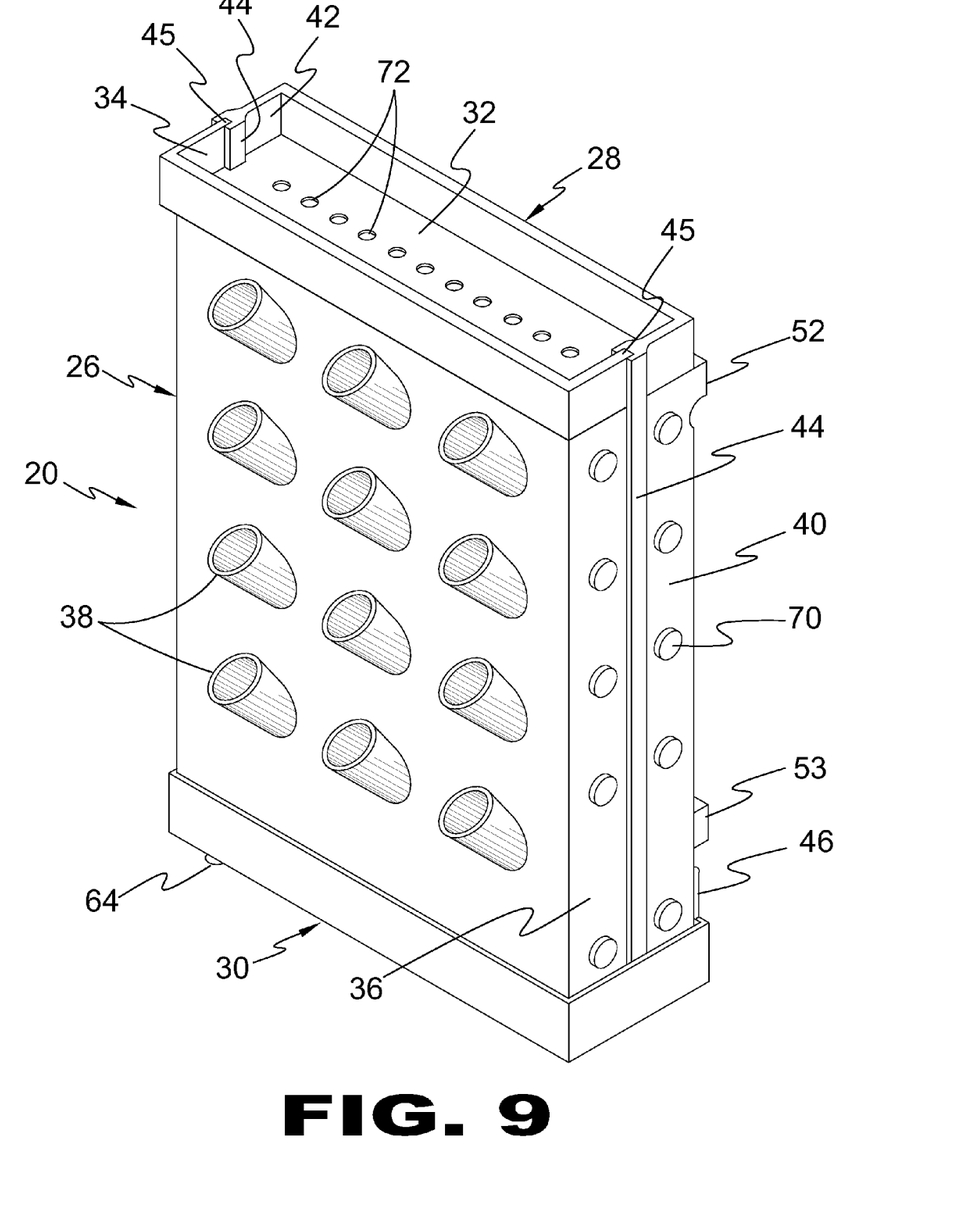
FIG. 9 is a perspective view of an additional element of the present invention.

Referring to FIG. 9, shown is a perspective view of an additional element of the present invention. The present invention provides a vertical planter 20 having an indefinite plurality of tangently extending plant receptacles 38 projecting from the front vertical planter portion 26.

Figure 10:
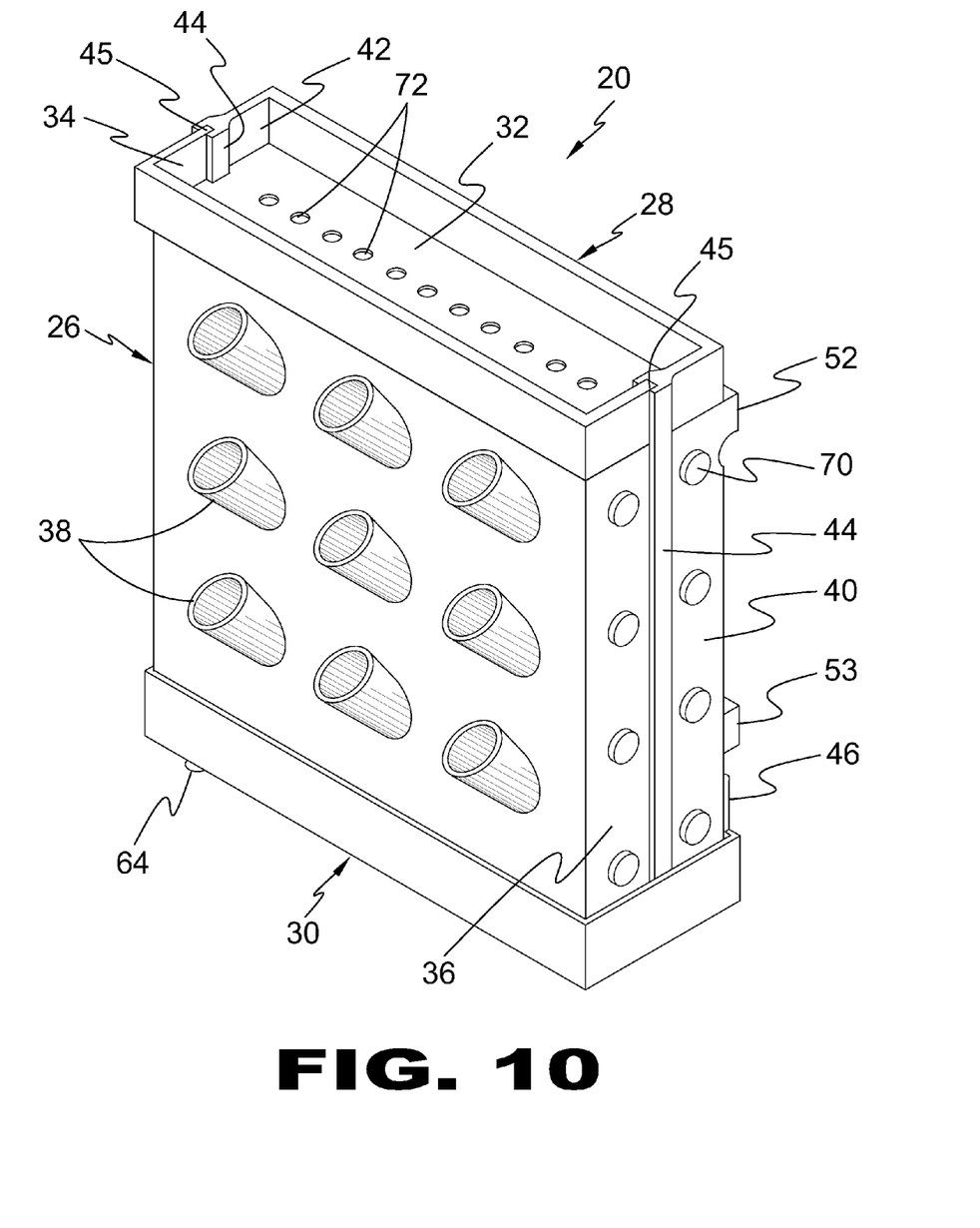
FIG. 10 is a perspective view of an additional element of the present invention.

Referring to FIG. 10, shown is a perspective view of an additional element of the present invention. The present invention provides a vertical planter 20 having an indefinite plurality of tangently extending plant receptacles 38 projecting from the front vertical planter portion 26.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

What is claimed is:

1. A vertical planter comprising:
    a) a front planar portion having substantially right-angled left and right sides;
    b) a back planar portion having substantially right-angled left and right sides;
    c) means for retaining the front planar portion to the back planar portion to form a hollow narrow rectangular shaped housing; wherein the retaining means comprises the left and right sides of the back portion each having a channel to receive and hold a respective free edge of the left and right sides of the front portion to maintain the back portion to the front portion;
    d) a plurality of plant receptacles extending tangentially from the front planar portion, in which each plant receptacle will receive a root ball of a plant therein;
    e) an interiorly extending ledge recessed from top ends of the front planar portion and the back planar portion;
    f) a top plate having a plurality of apertures, whereby the top plate rests upon the ledge;
    g) a base receptacle; and
    h) means for mating the housing in a vertical position to the base receptacle, in which the housing will hold soil therein to allow water to travel through the apertures in the top plate and into the soil to lubricate the root balls of the plants; wherein the mating means comprises: a) the back portion having a lower transverse rail; and
    b) the base receptacle having a longitudinal catch extending vertically therefrom to latch onto the lower transverse rail locking the base receptacle in place to the back portion.

2. The vertical planter as recited in claim 1, wherein the back portion further comprises:
    a) an upper transverse hook; and
    b) a transverse spacer bar above the lower transverse rail, whereby the spacer bar will cause the back portion to hang vertically when the transverse hook engages the wall.

3. The vertical planter as recited in claim 1, wherein the base receptacle comprises:
    a) a bottom wall;
    b) a front wall;
    c) a pair of side walls; and
    d) a back wall, whereby the longitudinal catch curvilinearly extends from the back wall.

4. The vertical planter as recited in claim 3, wherein the base receptacle further comprises:
    a) the bottom wall having a drain aperture; and
    b) a drain nipple extending from the drain aperture in which a drain hose can be fastened to the drain nipple.

5. The vertical planter as recited in claim 1, further comprising a plurality of spaces placed along the length of the left and right sides of the front portion and the left and right sides of the back portion, whereby when planters are placed side by side the spacers will engage with each other compensating for the thicknesses of the base receptacles.

* * * * *